United States Patent [19]

Campbell

[11] 4,194,082
[45] Mar. 18, 1980

[54] HEAT RECOVERABLE CLOSURE WITH SUBSTRATE PROTECTIVE MEANS

[75] Inventor: Bruce D. Campbell, Redwood City, Calif.

[73] Assignee: Raychem Corporation, Menlo Park, Calif.

[21] Appl. No.: 908,976

[22] Filed: May 24, 1978

[51] Int. Cl.² ............... H02G 15/04; B29C 27/00; B32B 31/00
[52] U.S. Cl. ........................... 174/74 A; 156/86; 174/DIG. 8; 428/36
[58] Field of Search ............... 156/268, 86; 30/90.1, 30/90.4; 339/DIG. 1; 174/74 A, 84 R, 136, DIG. 8; 428/36, 913

[56] References Cited

U.S. PATENT DOCUMENTS

| | | | |
|---|---|---|---|
| 3,239,125 | 3/1966 | Sherlock | 174/DIG. 8 |
| 3,898,369 | 8/1975 | Clabburn | 174/DIG. 8 |
| 4,026,012 | 5/1977 | Smith et al. | 174/136 |

*Primary Examiner*—William R. Dixon, Jr.
*Attorney, Agent, or Firm*—Lyon & Lyon

[57] ABSTRACT

There is disclosed herein an apparatus for sealing to and protecting a cable jacket from damage when a sharp instrument is used to forcibly remove a sealed heat recoverable closure from the cable and a method for making same. The apparatus comprises a thin stainless steel sheet coated over part of its width on both sides with a thermoplastic adhesive. The adhesive coated sheet is wrapped around the part of the cable jacket to be protected and sealed and is secured by fiberglass reinforced tape. Heating of the closure causes the adhesive to flow thereby securing the shield in place.

10 Claims, 3 Drawing Figures

HEAT RECOVERABLE CLOSURE WITH SUBSTRATE PROTECTIVE MEANS

BACKGROUND OF THE INVENTION

The present invention relates to the field of heat recoverable closures for elongate substrates and more particularly to preconnectorized cable closure systems.

Various methods of sealing preconnectorized cable closures have been devised in the prior art. The simplest and least effective involves wrapping several plastic bags around the preconnectorized cable end and taping the junction of the bag and the cable. This arrangement not only offers no physical protection for the delicate connectors but leaks as well. Customarily, the cables are wound and unwound from large drums. Large stresses are placed on the cable in these operations and results in stress on the seal between the cable and the closure protection apparatus. In the plastic bag arrangement neither tape nor adhesive could dependably withstand these stresses without leaking. Broken connectors caused by the lack of a physical protection caused lost time and money making repairs in the field.

A heat recoverable molded closure was devised that was sturdy and leakproof. With a heat recoverable molded closure arrangement, the connectors are within a molded container with a heat recoverable neck which neck is recovered about the preconnectorized cable to form a watertight seal with substantial mechanical durability and strain relief.

This arrangement worked well until removal of the closure was necessary. The materials of these devices was so tough that a knife and hammer was necessary to cut through the neck of the portion of the closure sealing the cable jacket. This often resulted in damage to the underlying cable jacket which was time consuming to repair.

The applicant has recognized that a stainless steel shield between the cable jacket and the heat recoverable portion of the closure would eliminate the danger of damage to the cable jacket when cutting the closure free.

Since many preconnectorized cables are used annually in telephone installations, a closure for sealing the preconnectorized cable in transit is of substantially utility and commercial importance.

Accordingly, the present invention is directed toward a sealed closure apparatus and method of making and using same which will protect preconnectorized cables and the like during removal of closure devices by forceful means.

The present invention is useful in telephone, power and other communication cable applications.

The advantages and features of the present invention will become more apparent from the following description of the embodiment thereof taken in conjunction with the accompanying drawings in which FIG. 1 is a drawing of a thermoplastic adhesive coated flexible metallic member.

Figure 1:
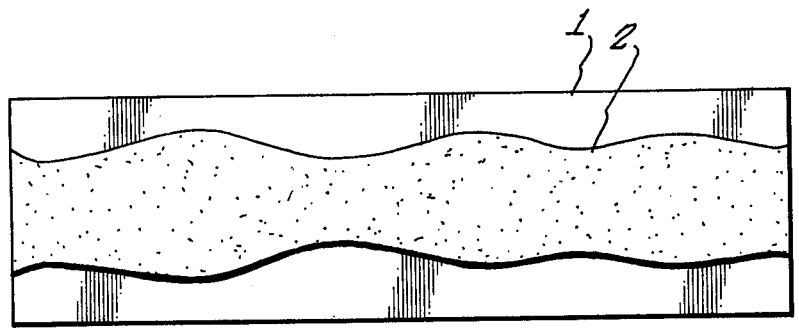

Turning now to the drawings, the metallic member of the present invention is shown in FIG. 1. Said member 1 is comprised of stainless steel approximately 6 inches wide and 15 inches long. The width and length dimensions can be varied depending upon the size of cable and closure to be used.

In the preferred embodiment, 0.005 gauge stainless 1 NIDA/SIDA No. 22220 is used for the proper balance of tensile strength and toughness to malleability. The preferred embodiment utilized stainless steel of 220,000 psi tensile strength. This is sufficient strength and thickness to protect a cable from sharp instrumentalities used in closure removal, without being so stiff as to preclude use of the stainless steel on small diameter cables. Thicker gauges and stronger types of steel may be used as long as they may be easily wrapped around the smallest diameter cables to be used. For example, 0.007 gauge can be used successfully on four inch diameter cables but is too thick to be wrapped around a one inch diameter cable. Likewise, tensile strength of up to 280,000 psi may be successfully used in some applications but may be unsuitable in others. The sheet of stainless steel can have a thickness from 0.003 to 0.007 inches and a tensile strength of 100,000 pounds per square inch or greater. It is to be understood that in some applications the metallic member need not be wrapped entirely around the cable to afford jacket protection during removal.

The stainless steel strip 1 is coated over part of the surface of both sides by a thermoplastic adhesive 2 such as Raychem S 1017, (a polyamide based adhesive) available from Raychem Corporation, Menlo Park, Calif. Such an adhesive flows and becomes tacky above a temperature of 200° F. This coating is done by nip roll coating over both sides of the stainless steel. The steel is heated to the "tack" point of the adhesive—i.e., approximately 250–300 degrees Fahrenheit.

The S 1017 adhesive comes in a roll just like the rolls the steel stock comes in. Two rolls of adhesive are used per roll of steel. The three rolls are then run together through a pair of rollers which presses the adhesive onto the steel on both sides.

Figure 2:
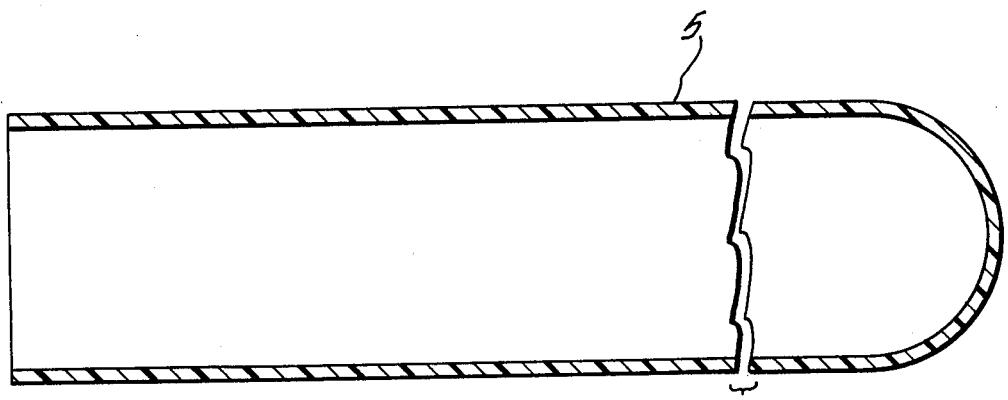
FIG. 2 is a view of the closure in uncovered form.
Figure 3:
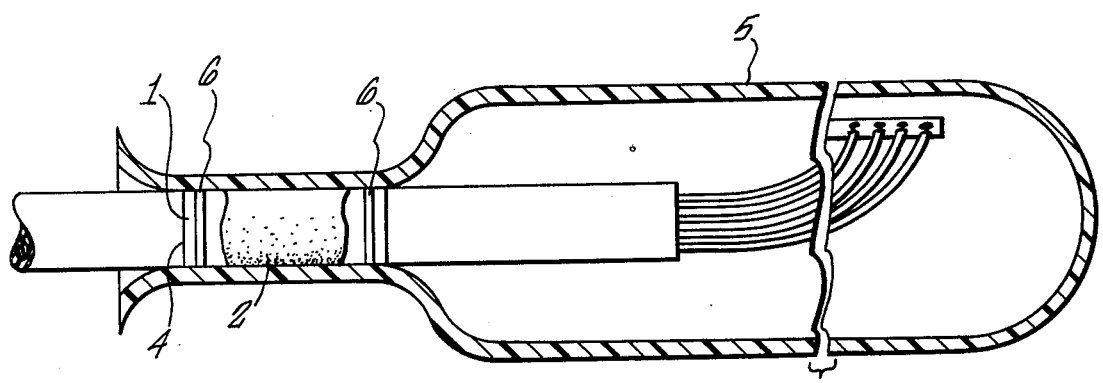
FIG. 3 is a view of the overall system with an expanded view of the neck portion showing the relationship of the flexible member to the cable.

Turning now to FIGS. 2 and 3, FIG. 2 shows the closure 5 in its original expanded form. FIG. 3 shows the closure 5 with the metallic member 1 in place around the portion of cable under the neck 3 of the closure.

Installation of the metallic member is accomplished by wrapping the portion of the cable 4 directly beneath the neck 3 portion of the closure 5 with the metallic member coated on both sides with the S 1017 adhesive. The wrap is secured in place by fiberglass reinforced tape 6. Heat is then continually applied to the neck of the closure 5 until it shrinks down into contact with the thermoplastic adhesive 2. When the adhesive 2 on both sides of the metallic member gets hot enough, it flows into sealing engagement with the cable 4 and the neck of the closure 5 forming a liquid-tight seal upon cooling.

Although the present embodiment has been described in terms of stainless steel, other types of materials are intended to be included.

While embodiments and applications of this invention have been shown and described, it would be apparent to those skilled in the art that many more modifications are possible without departing from the inventive concepts herein described. The invention, therefore, is not to be restricted except by the spirit of the appended claims.

I claim:
1. An article comprising:
 (a) an elongate substrate;
 (b) a heat recoverable closure disposed about an exterior portion of said substrate; and

(c) penetration resistant means removably interposed at least partially between said substrate and said closure for forming a moisture proof seal between a selected portion of the exterior of said substrate and a selected overlying portion of said closure, whereby said closure may be removed after installation with a sharp tool without damage to the exterior of said substrate, the penetration resistant means comprising:
  (i) a flexible member possessing substantially parallel inner and outer surfaces, the flexible member having sufficient strength and thickness to protect the elongate substrate from sharp instrumentalities and sufficient flexibility to be wrapped around the elongate substrate; and
  (ii) a layer of thermoplastic adhesive juxtaposed a portion of at least one of the surfaces of the flexible metallic member, said adhesive flowing and becoming tacky above a temperature of 200° F., whereby after installation said thermoplastic adhesive removably seals said flexible member between the elongate substrate and the heat recoverable closure.

2. The article of claim 1 where said flexible member is metallic and has
a layer of thermoplastic adhesive juxtaposed a portion of its inner surface and
a layer of thermoplastic adhesive juxtaposed a portion of its outer surface, whereby after installation a portion of said thermoplastic adhesive is sealingly disposed between a portion of said heat recoverable closure and a portion of said outer surface of said flexible metallic member and a portion of said thermoplastic adhesive is sealingly disposed between an exterior surface portion of said substrate and a portion of said inner surface of said flexible metallic member.

3. The article of claim 2 wherein said flexible metallic member comprises a sheet of stainless steel.

4. The article of claim 3 wherein said sheet of stainless steel has a thickness from 0.003 to 0.007 inches and a tensile strength of 100,000 pounds per square inch or greater.

5. The article of claim 1 wherein said elongate substrate comprises a telephone cable.

6. The article of claim 1 wherein said heat recoverable closure is a cap.

7. The article of claim 1 wherein said heat recoverable closure is a sleeve.

8. The article of claim 1 wherein said flexible member is wrapped completely around an exterior portion of said elongate substrate.

9. The article of claim 1 wherein said flexible member is disposed only partially around an exterior portion of said elongate substrate.

10. A method for forming a waterproof seal between an elongate substrate and a heat recoverable closure which provides protection from substrate damage upon forcible removal of said closure employing sharp instrumentalities comprising the steps of:
  (a) positioning a flexible metallic member coated on both sides with a thermoplastic adhesive that flows and becomes tacky above a temperature of 200° F. about at least a portion of the exterior surface of said elongate substrate, the flexible metallic member having sufficient strength and thickness to protect the elongate substrate from sharp instrumentalities and sufficient flexibility to be wrapped around the elongate substrate;
  (b) affixing said metallic member removably in place;
  (c) positioning a portion of an open end of said heat recoverable closure in overlying relationship with said metallic member;
  (d) heating said open end of said closure to at least 200° F. to cause said open end to recover about said metallic member and said elongate substrate thereby causing said thermoplastic adhesive to melt and flow; and
  (e) cooling said closure thereby forming a waterproof seal between said closure and said substrate, whereby a sharp instrumentality employed to cut said closure during removal will not penetrate said metallic member and damage said substrate.

* * * * *